United States Patent Office 3,104,223
Patented Sept. 17, 1963

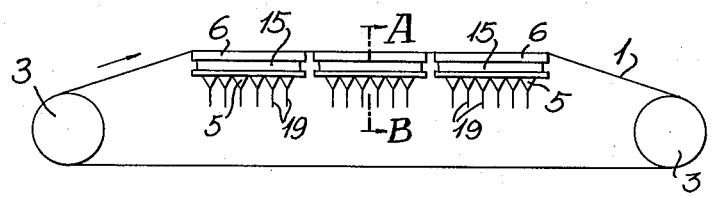
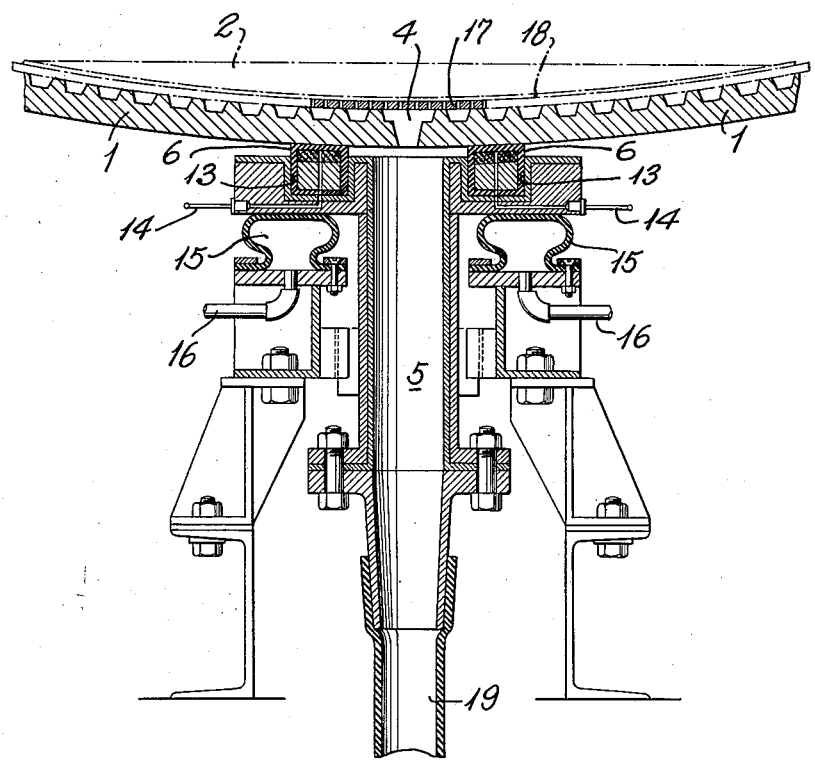

3,104,223
VACUUM-AIRTIGHT ARRANGEMENT FOR ENDLESS BELT FILTER
Eitaro Kasuya, Tokyo, Japan, assignor to Nissan Chemical Industries, Ltd., Tokyo, Japan, a corporation of Japan
Filed Dec. 7, 1960, Ser. No. 74,281
Claims priority, application Japan Dec. 12, 1959
6 Claims. (Cl. 210—400)

This invention relates to a new endless belt filter. The endless belt filter of known type has been consisted of a conveyor belt driven by two rotating drums arranged at front and back and a suction box which contacts with the under-face of the belt. The belt is lined with filter cloth and conveys substances on the cloth, while filtering and washing successively, and the filtrate is drawn into the suction box which is connected to a vacuum pump and a discharge pipe.

The under-face of the conveyor belt is in contact with the upper part of the suction box, and the belt slides on it while maintaining vacuum in the suction box. Since the sliding face bears the load of belt, it is essential that arrangement is so made as to operate this part smoothly.

The construction of this sliding part has been hitherto given out in Japanese patent application publication No. 2,359/1935, Japanese utility model application publication Nos. 13,880/1938 and 17,038/1938.

The present invention relates to a vacuum, air-tight arrangement for endless belt filter driven by rotary drums, in which tight contact and smooth sliding action between a conveyor belt and the upper face of a suction box is attained by means of a system entirely different from those previously known, characterized in that an air-tight strip made of oil saturated soft rubber is inserted between the under-face of the conveyor belt and the upper part of the suction box, and supported on an air spring.

The object of the invention is to provide an arrangement which produces a vacuum tight connection between conveyor belt and suction box with a minimum of pressure on their contact faces thereby protecting the sliding faces from wear.

The arrangement of the invention will now be described with reference to the accompanying drawings, in which:

FIG. 1 is a side elevation of an endless belt filter equipped with the vacuum-tight arrangement of the present invention, showing the manner of its fitting;

FIG. 2 is a cross sectional view of the arrangement taken along the line A—B in FIG. 1;

Figure 3:
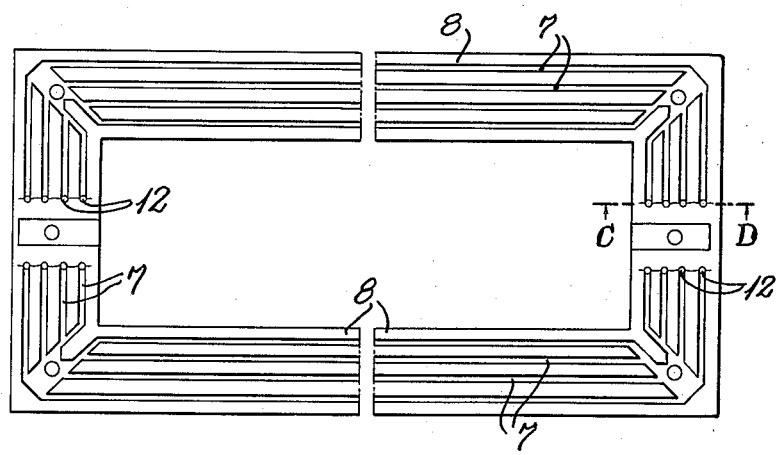
FIG. 3 is a plan view of an air-tight cushion shown in FIG. 2.

In FIG. 1, a conveyor belt 1 is driven by rotary drums 3 to slide on the upper face of an air-tight strip 6. The air-tight strip is mounted on the upper part of a suction box 5 and supported on air springs 15. The suction box is connected by a rubber hose 19 to a vacuum pump.

In FIG. 2, a hole 4 on the conveyor belt is for extraction of filtrate. A filter cloth 18 and a perforated belt 17 supporting said filter cloth 18 are laid together on the conveyor belt, and the liquid to be filtered 2 is carried thereon. The air-tight strip is fitted in a groove 13 arranged in the upper part of the suction box, and lubricating oil is supplied into grooves of the upper face of the air-tight strip through oil pipe 14 provided at the side wall. As the air-tight strip is supported on air springs 15 and by the regulation of air pressure thereto, the pressure between the upper face of the air-tight strip and the under-face of the conveyor belt can freely be adjusted. A pipe 16 for supplying compressed air into the air spring is connected to an air compressor and a pressure controlling valve.

The upper face of the air-tight strip, as shown in FIG. 3, is covered with soft rubber 8 on which a number of oil grooves 7 are provided for retaining lubricant.

Figure 4:
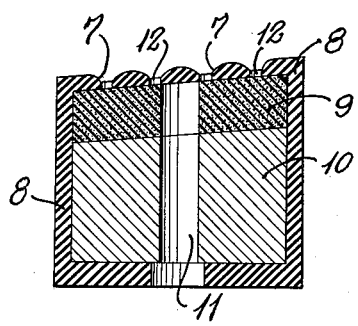
FIG. 4 is a cross sectional view of the air-tight cushion taken along the line C—D in FIG. 3.

FIG. 4 gives a detailed construction of the above arrangement, showing that lubricant comes through oil pipe to oil holes 11 and 12, thence to grooves 7.

The interior of the air-tight strip is enclosed by a soft rubber casing 8 and conatins a sponge like material 9 for cushioning and a metallic reinforcement 10.

The special feature of this invention may be itemized as follows:

(a) By the use of air springs for bringing together of contact faces, the determination of correct pressure for the maintenance of vacuum, can be easily attained with the help of pressure gauge indication. This, in comparison with the use of an ordinary metallic spring, has the advantage in that there is no possibility of over-pressure and it minimizes the wear of contact faces.

(b) The upper face of the air-tight strip being composed of soft rubber (hardness number 45–50 in JIS (Japanese Industrial Standard) and the under-face of the conveyor belt of rubber of hardness number 65 in JIS, practically all the wear due to sliding is eliminated. The soft rubber forming the upper face of the air-tight strip should be regarded as wearing part, so that the rubber is changed for a new one at a suitable interval say, every two months.

(c) The fact that the sliding faces are provided with oil grooves to permit a constant oil supply to the faces, reduces the frictional resistance to a minimum and prevents excess loading of belt. On this score, the present system has the advantage over the system (see patent application publication No. 9,947/1953) of using a sliding belt.

(d) The procedure of changing the air-tight strip 6 by removing it from the groove 13 is an extremely simple matter. The worn strip may be used repeatedly by reprocessing the upper surface with new rubber lining. On this point, it is less expensive than the system of sliding belt (patent application publication No. 9,947/1953).

What I claim is:

1. Filtering apparatus of the band filter type having an endless belt and a plurality of suction boxes, the endless belt passing over the suction boxes which exert suction forces thereon to cause filtration of material supported on said belt, the suction boxes each comprising a rectangular body having central suction openings and a marginal element supporting the endless belt in slidable relation, said marginal element having a rectangular cross-section and comprising a hollow flexible casing having an upper surface for supporting the belt thereon, said upper surface being provided with a plurality of grooves therein, means for feeding lubricant to said grooves whereby frictional resistance between the endless belt and the suction boxes is minimized, said marginal elements further comprising sponge means within the hollow casing beneath said upper surface and metallic reinforcement means within the casing filling the same and supporting the sponge means, the apparatus further comprising air spring means adjustably and resiliently urging the suction boxes into contact with the belt to maintain an airtight relation therebetween.

2. Filtering apparatus as claimed in claim 1 wherein said hollow flexible casing is rubber.

3. Filtering apparatus as claimed in claim 1 wherein said means for feeding lubricant to said grooves comprises a lubrication conduit in said marginal element extending externally thereof and passing through the metallic reinforcement means and the sponge means and into communication with the grooves in the upper surface of the casing.

4. Apparatus as claimed in claim 2 wherein the air spring means includes a hollow casing adapted to be connected to a source of air which can be pressure regulated whereby the pressure between the endless belt and the suction boxes can be adjusted.

5. Filtering apparatus as claimed in claim 1 wherein each rectangular body is removably supported in the associated suction box, said hollow flexible casing of the marginal element being removable and thereby replaceable when the casing becomes worn.

6. Filtering apparatus as claimed in claim 1 wherein said marginal elements have a substantially square cross-section.

References Cited in the file of this patent
UNITED STATES PATENTS

| | | |
|---|---|---|
| 1,879,474 | Pontoppidan | Sept. 27, 1932 |
| 2,377,252 | Lehrecke | May 29, 1945 |
| 2,561,282 | Leffler | July 17, 1951 |
| 2,568,420 | Thomson | Sept. 18, 1951 |